3,623,957

United States Patent

[72] Inventor Louis I. Feldman
Spring Valley, N.Y.
[21] Appl. No. 4,737
[22] Filed Jan. 21, 1970
[45] Patented Nov. 30, 1971
[73] Assignee Baxter Laboratories, Inc.
Morton Grove, Ill.

[54] PREPARATION OF MICROBIAL ALKALINE PROTEASE BY FERMENTATION WITH BACILLUS SUBTILIS, VARIETY LICHENIFORMIS
10 Claims, No Drawings

[52] U.S. Cl. ........................................... 195/66 R
[51] Int. Cl. ............................................. C12d 13/10
[50] Field of Search ............................. 195/66, 62

[56] References Cited
OTHER REFERENCES

Hall, " The Proteolytic Enzymes of Bacillus licheniformis" Dissertation Abstracts Vol. 27 (1966) pages 2277-B to 2278-B.

Primary Examiner—Lionel M. Shapiro
Attorneys—Walter C. Kehm and W. Garrettson Ellis ABSTRACT: Alkaline protease is prepared by culturing a selected micro-organism of the species *Bacillus subtilis*, variety *licheniformis* in a nutrient medium optionally in the presence of cottonseed protein, and thereafter separating the alkaline protease thereby produced from said medium.

PREPARATION OF MICROBIAL ALKALINE PROTEASE BY FERMENTATION WITH BACILLUS SUBTILIS, VARIETY LICHENIFORMIS

BACKGROUND OF THE INVENTION

The term "alkaline protease" stands for a class of proteolytic enzymes which are operative in the alkaline pH range, e.g., about pH 8 to 11.5. These materials show great promise as cleaning agents for removing stains from clothing in the frequent cases in which the stains have protein components. A further advantage of these materials is that they can generally be used in conjunction with commercial detergents. Thus, detergent formulations are available which contain alkaline protease for improving the performance of the formulations.

It is presently known to the art to produce alkaline protease by culturing the organism *Bacillus subtilis*. However, many organisms of this species give a low yield of alkaline protease, and thus the production of the material from these organisms is inefficient and expensive.

DESCRIPTION OF THE INVENTION

It has been found that the *licheniformis* variety of the organism *Bacillus subtilis* gives greatly improved yields of alkaline protease when compared with other varieties of *Bacillus subtilis*, and as such provides a substantial advantage in the preparation of alkaline protease because of the substantial gains in production efficiency obtained by use of the organism. *Licheniformis* is considered by some authorities to be a separate species from *subtilis*. However, it is very similar to *subtilis*, and is considered as a subspecies or variety thereof for purposes of this application.

The protease produced from *licheniformis* is separated from the culture, preferably by precipitation with methanol or another nonaqueous, polar solvent.

The alkaline protease produced by this invention generally has greater activity at higher temperatures than other alkaline proteases facilitating its use in automatic washing machines.

It has further been found that the *Bacillus subtilis*, variety *licheniformis* strain deposited at the Northern Regional Research Laboratories at Peoria, Ill. under the number NRRL B3723 is uniquely effective to produce significantly higher yields of high quality alkaline-stable protease having improved proteolytic activity at higher temperatures, and having a maximum proteolytic activity at about 57° to 67° C., measured at pH 8.5. This organism, when cultured in accordance with this invention, gives unsurpassed yields of superior alkaline protease.

Licheniformis organisms are cultured in a nutrient medium, preferably with periodic incremental additions of soluble carbohydrate during a major portion of the culturing period to maintain a reducing sugar level of about 0.4 to 1 weight percent of the culture medium, calculated as glucose. Preferably, the culturing is performed under aerobic conditions at a temperature of 30° to 40° C. and at a pH of 5.0 to 8.0 throughout the entire period of culturing in order to obtain an advantageously high yield of alkaline protease.

One advantage of the use of *licheniformis* is that it gives a low yield of amylase byproduct, while other high yield protease-producing organisms tend to produce large amounts of amylase.

It is particularly preferred to maintain a pH of 6.0 to 6.6 and a temperature of 34° to 38° C. throughout the culturing step.

It is also desirable for the nutrient medium to contain a small amount (e.g., about 2 to 5 weight percent) of cottonseed protein, which raises the production of alkaline protease to a particularly high level.

After the culturing has proceeded, generally for a period of time to produce a maximum yield of alkaline protease, the protease is typically separated from the rest of the medium. This can be done by filtering the medium to remove extraneous solids, washing the solids, and then precipitating alkaline protease from the filtrate.

Polar solvents having a low water content are generally useful to precipitate the alkaline protease from a culture filtrate. Typical solvents which can be used are acetone, diethylether, and alcohols of no more than about three carbon atoms such as methanol, ethanol and isopropanol. Mixtures of polar solvents can also be used. Another class of materials for precipitating alkaline protease from a culture filtrate are the soluble salts, for example, ammonium sulfate, sodium sulfate, potassium nitrate, and sodium chloride.

Prior to precipitation of alkaline protease from the filtrate of the culture, it is desirable to evaporate the culture filtrate and added wash solution to about 30 to 40 percent of its initial weight. The alkaline protease is then precipitated from this evaporate, preferably with an alcohol having no more than three carbon atoms such as methanol.

The protease so produced generally has a maximum proteolytic activity in a temperature range of about 57° to 67° C. at about pH 8.5.

The following example is for illustrative purposes only and is not to be construed as limiting the invention of this application.

EXAMPLE 1

Fermentations were conducted in 1 liter, baffled Erlenmeyer flasks containing 200 ml. of the following medium:

| | Weight Percent |
|---|---|
| Cornstarch degraded with alpha amylase enzyme | 15 |
| Lactose | 0.43 |
| Cottonseed protein (Pharmamedia)—manufactured by Trader's Protein Division, Fort Worth, Tex. | 3 |
| Brewers' yeast | 0.72 |
| Nutrisoy (a commercial soy protein preparation) | 0.365 |
| $MgSO_4 \cdot H_2O$ | 0.125 |
| $K_2HPO_4$ | 0.43 |
| Sodium chloride | 0.072 |
| Phosphoric acid (75%) | 1.29 |
| Calcium carbonate | 0.286 |
| Hydrated Ferrous Sulfate | 0.26 p.p.m. |
| Hydrated Manganese Sulfate | 2 p.p.m. |
| Hydrated Zinc Sulfate | 4 p.p.m. |
| Tap water | balance |

The above mixture was neutralized to a pH of 6.7 with ammonium hydroxide. The mixture was then sterilized at about 121° C. in an autoclave at an overpressure of one atmosphere for about 15 minutes.

Several flasks prepared in the manner described above were inoculated, each with a separated strain of either *Bacillus subtilis* or *Bacillus subtilis*, variety *licheniformis*. The flasks were then incubated on a rotary shaker at 37° C. for 138 hours. After this the concentration of alkaline protease in the resulting mixture was determined in the following manner:

A buffer solution of 3.0 grams of tris-(hydroxymethyl) aminomethane (known as "Tris"), mixed with 400 ml. of distilled water is prepared and titrated with 1 N Hydrochloric acid to pH 8.5 while stirring. Distilled water is then added to make a volume of 500 ml.

A substrate solution is made by adding 1.3 grams of casein to 80 ml. of a 0.05 M "Tris" buffer at pH 7.6 and stirred with heating to dissolve the casein. After cooling, additional buffer solution is added to make a volume of 100 ml.

A mixture to which the enzyme-containing products prepared in the above fermentation is added is made in a series of test tubes by mixing in each tube 3 ml. of the above substrate solution, 3 ml. of 0.02 N sodium hydroxide solution, and 3 ml. of 0.044 M sodium tripolyphosphate solution brought to pH 8.5 with HCl. The tubes are closed with stoppers and brought to a temperature of 37° C. The pH should be 8.5 or above.

A watch with a second hand is consulted, and at a given time, 3 ml. of an enzyme solution containing the alkaline protease to be assayed is added to each test tube, except to a control "substrate blank," which instead receives 3 ml. of the buffer solution prepared above. Tubes are mixed for at least 30 seconds by tapping the tube walls and then incubating at 37° C. Exactly 15 minutes after adding the enzyme solution, there is added to each tube 10 grams of trichloroacetic acid solution prepared by adding 18 grams of trichloroacetic acid, 19 grams of sodium acetate and 18.9 ml. of glacial acetic acid to a container, and then diluted to 1 liter with distilled water. This mixture destroys the enzyme and prevents further hydrolyzing by the enzyme of the casein present. The contents of each tube are then filtered through 11 cm. Whatman No. 42 paper with the first portion of the filtrate being refiltered through the paper.

Simultaneously, an "enzyme blank" is prepared by incubating 3 ml. of the enzyme solution for 15 minutes at 37° C. The solution is then added to a mixture of 3 ml. each of substrate solution, 0.2 N sodium hydroxide, and 0.044 M sodium tripolyphosphate after the mixture has been incubated for 15 minutes at 37° C., and 10 ml. of the above trichloroacetic acid solution added. After adding the enzyme solution, the mixture is incubated again at 37° C, with occasional shaking for one-half hour and filtered.

The optical densities of each of the above filtrates are then determined at 275 $\mu$ using a 10 mm. cell and a spectrophotometer which is set with the 100 percent transmission point being the reading of the "substrate blank" prepared above. The readings are then corrected by subtracting the optical density of the "enzyme blank" prepared above from the optical densities of the other test solutions.

The amount of alkaline protease present is then expressed in activity units which are calculated by the following formula:

$$\text{Protease activity units} = \frac{\text{The corrected optical density at 275 m}\mu\text{, of the hydrolyzate mixture in the test tube}}{\text{The optical density at 275 m}\mu\text{ of 1.5 mg. tyrosine per ml. (i.e. 0.0114)}} \times \frac{\text{Volume (i.e. 22 ml.)}}{\text{Time (i.e. 15 minutes)}}$$

In short, one activity unit is that amount of enzyme which produces in 1 minute, under the conditions of the above test, enough tyrosine and other materials by hydrolyzing casein to provide an optical density at 275 $\mu$ which is the same as a tyrosine solution containing 1.5 mg. of tyrosine per ml.

Referring again to the fermentation samples prepared above, each of the samples was assayed for the presence of protease activity units after the incubation period described above. The activity units present in each sample are listed below. Each of the strains are available from the Northern Regional Research Laboratories of Peoria, Ill., and are described by the culture numbers assigned them.

| Species and Strain of Cultured Organisms | Protease Activity Units Per ml. Produced After 138 Hours Fermentation |
|---|---|
| *Bacillus subtilis* | |
| NRRL B543 | 467 |
| NRRL B558 | 93 |
| NRRL B645 | 120 |
| NRRL B765 | 267 |
| NRRL B1324 | 453 |
| 1471 NRRL B1472 | 40 |
| *Bacillus subtilis*, variety *licheniformis* | |
| NRRL B358 | 1,733 |
| NRRL B643 | 3,200 |
| NRRL B1001 | 4,893 |
| NRRL B1100 | 3,040 |
| NRRL B1716 | 5,267 |
| NRRL B3723 | 7,993 |

After the 114th hour of fermentation, culture NRRL B1716 had 5933 units, and culture NRRL B3723 had 8890 protease activity units per ml. The remaining *licheniformis* strains had less protease activity than at 138 hours of fermentation.

In view of the above, it is plain that *licheniformis* generally yields a large increase of alkaline protease over the yield provided by other types of *Bacillus subtilis*, and NRRL B3723 gives about 50 percent greater yield of protease activity than the best previously known *licheniformis* strain.

The alkaline protease in the samples prepared above by fermentation with *Bacillus subtilis*, variety *licheniformis* can be extracted by filtering, and precipitating impurities from the filtrate by adding methanol to a 35 weight percent concentration and filtering again. The enzyme is then precipitated from the filtrate by adding more methanol to reach a final methanol concentration of 80 percent, while holding the temperature below 4° C. Particularly good results are obtained by adjusting the pH of the mixture to 5.5 to 5.6 prior to the precipitation of impurities with methanol.

EXAMPLE 2

A. A culture of *Bacillus subtilis*, variety *licheniformis* NRRL B3723 was heated at 60° C. for 20 minutes in a 0.85 percent sodium chloride solution, inoculated onto a potato plug, and grown for 24 hours at 37° C. Following this, portions of the potato plug were added to 1000 ml. of a mixture containing 4 grams of dextrose, 5 grams of sodium chloride, 10 grams of tryptone, 3 grams of beef extract, 1 gram of $K_2HPO_4$, 3 grams of yeast extract, and the balance water. This mixture was incubated for 18 hours at 37° C. on a rotary shaker to form a bacterial inoculum.

A mash composition was prepared containing the following ingredients:

| Ingredient | Parts by Weight of Ingredient |
|---|---|
| Amylase degraded starch solution (45 weight percent starch) | 124 |
| Lactose | 4.3 |
| $K_2HPO_4$ | 4.3 |
| Corn steep liquor | 26 |
| Phosphoric acid (75%) | 12.9 |
| Brewers' yeast | 7.2 |
| Soy protein (Kaysoy) | 3.65 |
| Calcium carbonate | 2.88 |
| Hydrated magnesium sulfate | 1.25 |
| Sodium chloride | 0.72 |
| A mixture of five parts by weight of bran and four parts by weight of lard oil | 9 |
| Hydrated ferrous sulfate | trace |
| Hydrated manganese sulfate | trace |
| Hydrated zinc sulfate | trace |
| Water | Sufficient to make a total weight of 1,000 parts by weight |

The above mash is batch sterilized for 45 minutes at 125° to 130° C., and cooled to 35° to 37° C. Sterile ammonia is added to provide a pH of 6.3 to 6.6. About 0.3 weight percent of the bacterial inoculum previously prepared is added to the mash, and fermentation is allowed to proceed for about 20 hours with aeration and agitation. During this period the temperature is maintained at 35° to 37° C., and the pH is maintained between 6.1 and 6.5 by periodic addition of ammonia.

Following this, another mash composition similar to the above mash is prepared, except that 372 parts by weight of the 45 percent enzyme-degraded starch solution is added, with correspondingly less water being added. The mash is batch sterilized under the previously described conditions, cooled to 35° to 37° C., and ammonia added to provide a pH of 6.4 to 6.6.

About 80 pounds of the previously fermented mash are added to the new mash composition, and fermentation is allowed to proceed for 58 hours under the previous fermentation conditions. The carbohydrate content of the fermentation mixture is periodically assayed, and periodic additions of about 17 parts by weight of the above enzyme-degraded starch solution are performed to maintain the reducing sugar level between 0.4 and 1 percent by weight. Typically, the carbohydrate additions are made at 3 hour intervals.

The alkaline protease present was assayed by the method described above to give the following results:

| Hours of Fermentation | Protease Activity Units per ml. |
|---|---|
| 34 | 2,784 |
| 42 | 23,865 |
| 46 | 24,166 |
| 50 | 24,682 |
| 58 | 23,693 |

The resulting mash is then filtered and the filter residue is washed with tap water.

The filtrate is evaporated to a concentration of about 18° Be. and is then cooled to 3° C. and adjusted to a slightly acid pH. Methanol is added to a methanol concentration of about 80 percent to precipitate the protease, which is then filtered away from the liquid phase.

The alkaline protease produced by the above process exhibits a maximum proteolytic activity at about 60° to 65° C., measured by its hydrolysis of casein for 10 minutes at pH 8.5. The alkaline protease exhibits maximum proteolytic activity at about pH 10 at a temperature of 37° C. and at about pH 9.6 at 61° C.

B. The experiment of example 2(A) was again repeated except that the organism of strain NRRL B3723 was replaced with another strain of *Bacillus subtilis*, variety *licheniformis*. The results were as follows:

| Hours of Fermentation | Protease Activity Units Per ml. |
|---|---|
| 34 | 602 |
| 42 | 3,892 |
| 46 | 9,073 |
| 50 | 11,503 |
| 54 | 13,395 |
| 58 | 13,223 |

EXAMPLE 3

The experiment of example 2(A) was repeated except that the corn steep liquor ingredient, and some water, was replaced with 3 weight percent of cottonseed meal (Pharmamedia). The results were:

| Hours of Fermentation | Protease Activity Units Per ml. |
|---|---|
| 34 | 10,262 |
| 42 | 22,619 |
| 46 | 24,410 |
| 50 | 27,323 |
| 54 | 28,071 |
| 58 | 26,138 |

EXAMPLE 4

Generally equivalent results to those of examples 2(A) are obtained upon (1) substitution of the 12.9 parts by weight of phosphoric acid with 3.2 parts by weight of disodium phosphate and 4 parts by weight of monosodium phosphate, or upon (2) substitution of the lactose with an equivalent amount of water.

EXAMPLE 5

Generally equivalent results are obtained upon substitution of the last mash composition used in example 2(A) with a mash composition of the following formulation:

| Ingredient | Percent by Weight |
|---|---|
| A commercially available mother liquor byproduct of dextrose crystallization (Enzose EO81) | 18.6 |
| Spray dried whey | 2.0 |
| Soy protein (Kaysoy) | 2.0 |
| Corn steep liquor | 2.5 |
| Monopotassium phosphate | 0.4 |
| Calcium carbonate | 0.15 |
| Magnesium sulfate | 0.15 |
| Lard oil | 0.33 |
| Water | balance |

Additional Enzose EO 81 ingredient is added periodically to maintain reducing sugar level in the mash between 0.4 and 1 percent by weight during fermentation.

What is claimed is:

1. The process of culturing the micro-organism *Bacillus subtilis*, variety *licheniformis*, NRRL B3723 in a nutrient medium, and thereafter separating alkaline protease thereby produced from said medium.

2. The process of claim 1 in which said micro-organism is cultured aerobically in a nutrient medium at a temperature of 30° C. and pH of 5.0 to 8.0.

3. The process of claim 2 in which said micro-organism if cultured at a temperature of 34° to 38° C., and a pH of 6.0 to 6.6.

4. The process of claim 2 in which said protease is separated by filtering the product of said culturing and thereafter precipitating the protease from the filtrate with an alcohol having no more than three carbon atoms.

5. The process of claim 4 in which said alcohol is methanol.

6. The process of claim 2 in which said nutrient medium contains from 2 to 5 weight percent of cottonseed protein.

7. The process of culturing a micro-organism of the species *Bacillus subtilis*, variety *licheniformis* aerobically in a nutrient medium at a pH of 5.0 to 8.0 in which said nutrient medium contains from 2 to 5 weight percent of cottonseed protein, to obtain an improved yield of alkaline protease.

8. The process of claim 7 in which said temperature is 30° to 40° C.

9. The process of claim 8 in which said micro-organism is cultured at a temperature of 34° to 38° C. and a pH of 6.0 to 6.6.

10. The process of claim 7 in which said micro-organism is *Bacillus subtilis*, variety *licheniformis*, NRRL B3723.

\* \* \* \* \*